US009760391B2

(12) United States Patent
Kiess et al.

(10) Patent No.: US 9,760,391 B2
(45) Date of Patent: Sep. 12, 2017

(54) METHOD AND APPARATUS FOR NETWORK VIRTUALIZATION

(71) Applicant: NTT DOCOMO, Inc., Chiyoda-ku, Tokyo (JP)

(72) Inventors: Wolfgang Kiess, Munich (DE); Joan Triay Marques, Munich (DE); David Perez Caparros, Munich (DE); Ashiq Khan, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 402 days.

(21) Appl. No.: 14/483,832

(22) Filed: Sep. 11, 2014

(65) Prior Publication Data

US 2015/0082308 A1  Mar. 19, 2015

(30) Foreign Application Priority Data

Sep. 13, 2013  (EP) .................................... 13184427

(51) Int. Cl.
   *G06F 9/455*  (2006.01)
   *G06F 9/50*  (2006.01)
   *H04L 12/26*  (2006.01)

(52) U.S. Cl.
   CPC ........ G06F 9/45558 (2013.01); G06F 9/5072 (2013.01); G06F 9/5077 (2013.01); H04L 43/0888 (2013.01); *G06F 2009/4557* (2013.01)

(58) Field of Classification Search
   CPC .. G06F 9/45558; G06F 9/5072; G06F 9/5077; G06F 2009/4557; H04L 43/0888
   See application file for complete search history.

(56) References Cited

U.S. PATENT DOCUMENTS 8,276,140 B1 *  9/2012  Beda, III ............... G06F 9/5077
                                                 709/224
2007/0043860 A1  2/2007  Pabari
(Continued)

OTHER PUBLICATIONS

Extended European Search Report in corresponding European Application No. 13184427.6, dated Feb. 17, 2014, 8 pages.

*Primary Examiner* — Arvin Eskandarnia
*Assistant Examiner* — Gil H. Lee
(74) *Attorney, Agent, or Firm* — Brinks Gilson & Lione

(57) ABSTRACT

A method for implementing an entity of a network by virtualizing said network entity and implementing it on one or more servers each acting as an execution unit for executing thereon one or more applications running and/or one or more virtual machines running on said execution unit, each of said application programs or virtual machines running on a server and implementing at least a part of the functionality of said network entity being called a virtual network function VNF module, wherein a plurality of said VNF modules together implement said network entity to thereby form a virtual network function VNF, said method comprising the steps of: obtaining m key performance indicators (KPI) specifying the required overall performance of the VNF, obtaining n performance characteristics for available types of execution units, determining one or more possible deployment plans based on the obtained m KPI and n performance characteristics, each deployment plan specifying the number and types of execution units, such that the joint performance of VNF modules running on these execution units achieves the required overall performance of the VNF.

13 Claims, 12 Drawing Sheets

(56) References Cited

U.S. PATENT DOCUMENTS

| | | |
|---|---|---|
| 2008/0155537 A1 | 6/2008 | Dinda et al. |
| 2008/0244595 A1* | 10/2008 | Eilam .................. G06F 8/10 718/104 |
| 2012/0166624 A1 | 6/2012 | Suit |
| 2013/0014101 A1 | 1/2013 | Ballani et al. |
| 2014/0122724 A1* | 5/2014 | Zhang ................ H04L 49/70 709/226 |
| 2014/0317261 A1* | 10/2014 | Shatzkamer ......... G06F 9/455 709/223 |

* cited by examiner

METHOD AND APPARATUS FOR NETWORK VIRTUALIZATION

RELATED APPLICATIONS

This application claims priority under 35 U.S.C. §119 to European Patent Application No. 13184427.6 filed on Sep. 13, 2013, the entire content of which is hereby incorporated by reference.

FIELD OF THE INVENTION

The present invention relates to a method and an apparatus for implementing virtualized network functions.

BACKGROUND OF THE INVENTION

There are existing solutions for the virtualization of network functions.

Most existing solutions to the problem of how software is defined, deployed, or computed fall into a category that can be labeled hardware follows software. This means that for a piece of software that is to be installed (a VNF-module in the terminology used herein), requirements on the hardware are fully specified. An example for this is given by WO 2013/043326. The description of the module contains thus information on the requirements and on the performance that a module achieves on such a specific hardware platform. An example is "this module provides a processing capacity of 1500 bearers and requires an Intel Xeon E7 processor and 8 GB of RAM". This has the disadvantages that firstly, if the hardware provides more resources than specified, capacity might be wasted, and secondly if only less powerful hardware is available, it might not be possible altogether to install and especially execute the module on this hardware.

Another example is given in US2012/0055398, where virtual groups of resources are defined based on performance requirements or type of VMs that can be instantiated on the cloud. The proposed cloud management system performs the mapping between the request and the virtual groups. However, such an invention considers (only) the instantiation of a single VM.

The concept of a template to automatically deploy a set of VMs is well known in the DevOps (development and operation) community. Tools like Chef (Opscode. Chef. [Online]. Available: opscode.com/chef.) or Puppet (Puppet Labs. Puppet. [Online]. Available: puppetlabs.com) can be used to describe the whole IT system configuration as code. These templates can be used to automatically deploy a system composed by different VMs running different applications (e.g. a web server connected to a database server). They focus on automating the deployment of software across several VMs and they provide very high level description of the hardware requirements for these VMs (e.g. number of vCPUs, RAM, storage capacity). However, these hardware requirements are static and if the cloud service provider does not match them the deployment is not feasible.

It is therefore an object of the present invention to provide a virtualization method and apparatus which can overcome the deficiencies of the prior art.

SUMMARY OF THE INVENTION

According to one embodiment there is provided a method for implementing an entity of a network by virtualizing said network entity and implementing it on one or more servers each acting as an execution unit for executing thereon one or more applications running and/or one or more virtual machines running on said execution unit, each of said application programs or virtual machines running on a server and implementing at least a part of the functionality of said network entity being called a virtual network function VNF module, wherein a plurality of said VNF modules together implement said network entity to thereby form a virtual network function VNF, said method comprising the steps of:

obtaining m key performance indicators (KPI) specifying the required overall performance of the VNF, obtaining n performance characteristics for available types of execution units, determining one or more possible deployment plans based on the obtained m KPI and n performance characteristics, each deployment plan specifying the number and types of execution units, such that the joint performance of VNF modules running on these execution units achieves the required overall performance of the VNF.

The numbers m and n can be integers which are 1 or larger, and the required overall performance may be specified by the KPI.

This provides an approach according to a new paradigm "software follows hardware" where the software implementation is chosen based on the characteristics of the hardware and the performance requirement of the software. This allows a more flexible implementation and avoids a possible waste of resources.

According to one embodiment one or more possible deployment plans are determined by setting into relation the m KPIs to the n performance characteristics of the different types of execution units.

This enables a choice among multiple possible implementations, possibly based on a cost or utility function to choose the most effective one.

According to one embodiment determining the one or more possible deployment plans is performed through an n:m mapping of n abstract performance characteristics for available types of execution units to m KPIs achieved by a VNF module performing on an execution unit of that type.

This allows a concrete implementation of how to find an actual implementation which on one hand meets the performance requirements but on the other hand is suitable and possible based on the available hardware.

According to one embodiment determining the one or more possible deployment plans is performed based on VNF module performance information for the available types of execution units obtained by determining a VNF module performance on a certain type of execution unit by installing this VNF module on this executing unit, putting load on this module with a traffic generator and measuring the KPIs that can be achieved without violating the QoS values specified for this VNF module and/or without violating the resource limits of this execution unit.

This is another way of finding an actual implementation of a deployment plan.

According to one embodiment the method further comprises the step of determining requirements for networking resources linking the VNF modules based on topology information of the one or more interconnected VNF modules and on KPIs of the VNF modules by an 1:k mapping which maps 1 KPIs of the VNFs to k link requirements.

This takes into account the topology of the actual implementations and enables to take into account the network resource requirements e.g. into a cost function.

According to one embodiment the method further comprises the step of determining one or more construction plans that specify an allocation of VNF modules to actual execution units according to the deployment plan, the requirements for networking resources, and the currently available datacenter resources.

This enables an actual implementation by one or more possible deployment plans which may be instantiated.

According to one embodiment the method further comprises the step of evaluating a utility function for the one or more construction plans, wherein the utility function preferably expresses the expected cost and/or electricity consumption of a specific deployment of a VNF in a datacenter, selecting a construction plan according to the maximum value of the utility function.

This enables the selection of the best and optimum virtualization implementation.

According to one embodiment the method further comprises the step of deploying individual VNF modules according to the selected construction plan.

In this manner the actual implementation is performed.

According to one embodiment the KPIs comprise the performance and/or capacity of the VNF, preferably specified in terms of the number of supported bearers and/or throughput and/or flows and/or sessions.

These are suitable implementations of the KPIs.

According to one embodiment the (abstract) performance characteristics comprise hardware performance parameters, preferably specified as GFLOPS, RAM, and/or IO capacity.

According to one embodiment possible compositions of a VNF through one or more interconnected VNF modules and the corresponding topology information are described by a VNF description template which is preferably stored in a VNF template repository and which describes the VNF topology as an interconnection of nodes, whereas the interconnections specify one or more of:

multiplicities for the links; and interconnections between the same node type; and interconnections between different node types These are implementations of VNF descriptions, which take into account the topology.

According to one embodiment the VNF description template includes the table specifying the n:m mapping of n abstract performance characteristics for available types of execution units to m KPIs achieved by a VNF module performing on an execution unit of that type, and/or the 1:k mapping for the links.

This is a specific implementation enabling to take into account network requirements of a virtualization.

According to one embodiment the VNF description template contains for each VNF module multiple instances of binary software, where each binary is compiled for another target platform (e.g. one for AMD 32 bit, the other for Intel 64 bit, . . . )

and the best suited binary is selected for the target execution unit.

This enables a choice among implementations on different virtualization platforms.

According to one embodiment knowledge on the mapping of abstract performance characteristics and actually achieved KPI is acquired under real world workloads and said knowledge is used to adjust the information contained in said n:m mapping included in the VNF description template.

This enables a feedback of the performance of actually implemented virtualizations and possibly enables an adaptation, if necessary.

According to one embodiment the method further comprises:

informing the VNF about a set of parameters that describe the performance of the hardware the VNF is installed on to enable a VNF to adapt to the underlying hardware.

Also this feedback mechanism enables an adaptation, if necessary.

According to one embodiment the parameters comprise parameters for the execution units on which the VNF modules are installed and parameters that describe the network links that interconnect these execution units/and or VNF modules.

These are concrete implementations of feedback parameters.

According to one embodiment the method further comprises an interface for providing requirements for a VNF, wherein these requirements comprise one or more of the following:

the type of VNF and the KPIs that it should accomplish;

information on the geographical area where the VNF is to be instantiated;

a maximum latency to interconnect a certain given node in the network and the newly instantiated VNF;

an update request on the required capacity of an VNF.

This enables another way of adaptation of an implementation.

According to one embodiment there is provided an apparatus for implementing an entity of a network by virtualizing said network entity and implementing it on one or more servers each acting as an execution unit for executing thereon one or more applications running and/or one or more virtual machines running on said execution unit, each of said application programs or virtual machines running on a server and implementing at least a part of the functionality of said network entity being called a virtual network function VNF module, wherein a plurality of said VNF modules together implement said network entity to thereby form a virtual network function VNF, said apparatus comprising A module for obtaining m key performance indicators (KPI) specifying the required overall performance of the VNF, a module for obtaining n performance characteristics for available types of execution units, a module for determining one or more possible deployment plans based on the obtained m KPI and n performance characteristics, each deployment plan specifying the number and types of execution units, such that the joint performance of VNF modules running on these execution units achieves the required overall performance of the VNF.

This provides an apparatus for virtualization of network functions.

According to one embodiment the method further comprises an apparatus further comprising one or more modules for performing the steps of a method according to one of the embodiments of the invention.

According to one embodiment the method further comprises a computer program comprising computer program code which when being executed on a computer enables said computer to perform a method according to one of the embodiments of the invention.

DETAILED DESCRIPTION OF THE PREFERRED EMBODIMENTS

Before describing embodiments of the invention at first some terms used in the following description are defined.

CMS: cloud management system; a system that comprises tools and methods for managing the physical resources contained in a cloud environment and the logical (virtual) machine instances running on top of such an infrastructure.

KPI: key performance indicator; a type of performance measurement used to evaluate the success of a particular network functions activity.

NCP: network configuration platform: the network operation and management system that manages the virtualization specific aspects of virtualized network functions.

NFV: network functions virtualization; the principle of separating network functions from the hardware they run on by using virtual hardware abstraction.

NMS: network management system; a system that comprises tools and methods for configuring and monitoring a network composed of individual network elements.

OSS operations support system; a computer system used by telecommunications service providers that offers supporting processes for maintaining network inventory, provisioning services, configuring network components, and managing faults.

VM: virtual machine; a software implementation of a machine that executes programs like a physical machine.

VNF: virtualized network function; a network function that has been virtualized and can be offered as a network service or be part of a service comprised of a set of virtualized network functions and/or non-virtualized network functions.

The present invention will be described as follows by means of exemplary embodiments.

Figure 1:
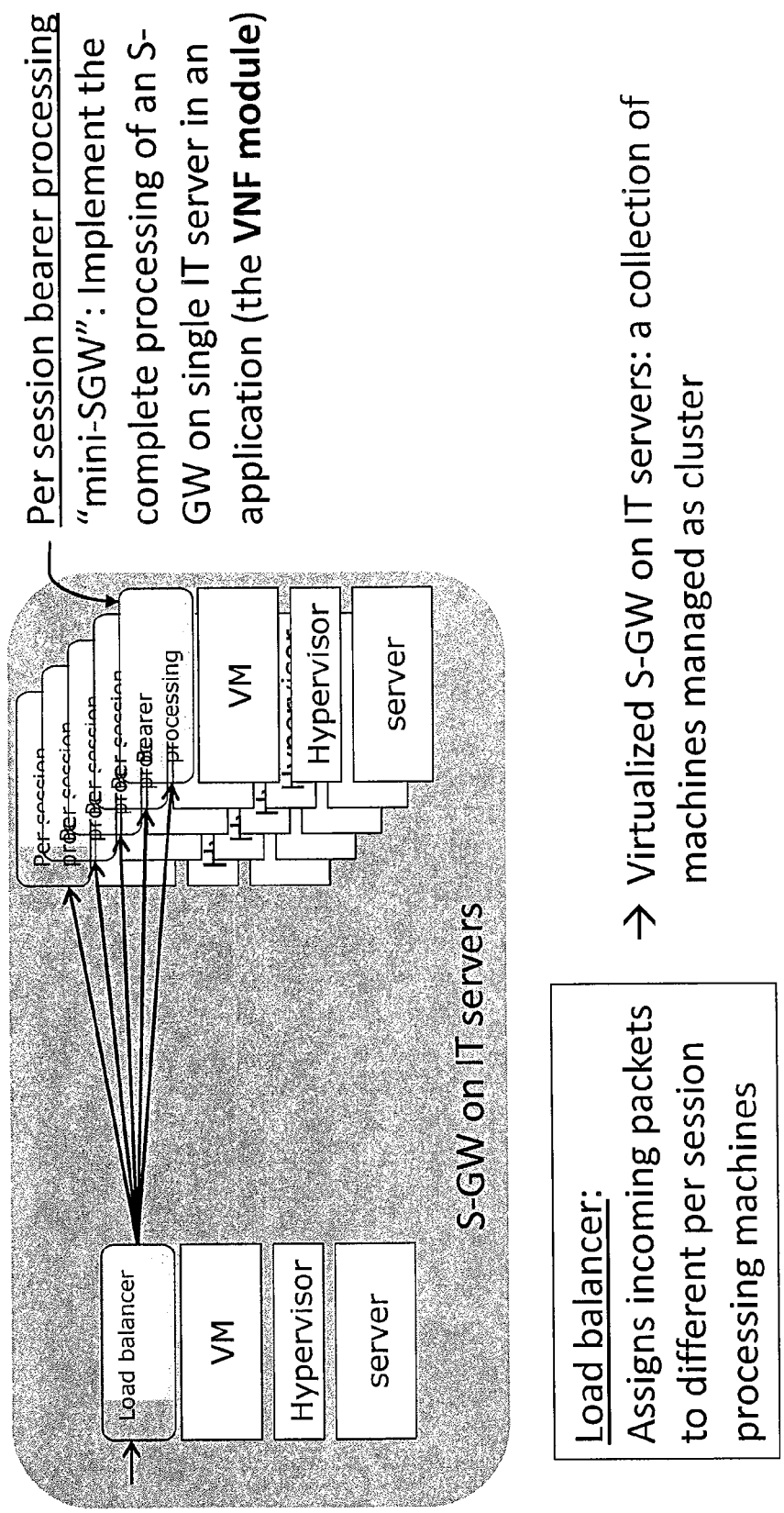
FIGS. 1 to 13 schematically illustrate embodiments of the invention.

Embodiments of the invention consider a scenario where network functions like a 3GPP evolved packet core (EPC) serving gateway (S-GW) or the firewall of a mobile network are virtualized and implemented on commercial off-the-shelf (COTS) IT servers. In the following such functions will be referred to as "virtualized network functions (VNF)". A virtualization scenario where a "S-Gateway" is virtualized is schematically illustrated in FIG. 1. It shows how a cluster S-GW could be composed of multiple elements installed on different IT servers. To the outside world, this cluster looks like a single S-GW.

One may assume that a single virtual S-GW will be implemented on a collection of IT servers following a cluster architecture as shown in FIG. 1. The complete cluster to the outside world appears as a single S-GW. Each IT server hosts one (or multiple) modules of such a virtualized network function that can be implemented as an application on the server or as shown in the figure within virtual machines (VM). Each of these modules is called VNF-module.

As an example for such an architecture, one may consider a S-GW composed of a "load balancer" VNF module and a "bearer processing" VNF module (cf. FIG. 1). The load balancer may classify incoming packets according to their tunnel ID and forward them to the responsible bearer processing VNF module. The bearer processing module does all the computations and tunnel handling that is necessary in a S-GW. With such an architecture, the capacity of the cluster can easily be scaled by adding or removing bearer processing modules, while to the outside world the whole system appears as a single S-GW.

The VNF according to an embodiment of the invention is defined by a VNF description template that contains the following elements: the software for the VNF-modules, information on the software installation, performance characteristics of the hardware to be used (e.g. expressed in an m:n table explained later), and topology information on how the modules are to be interconnected. A so called network configuration platform (NCP) then is responsible for computing an actual deployment of a VNF based on the previous template. This is then communicated to a cloud management system (CMS) that performs the embedding in a compute cloud.

By embodiments of the invention there is tackled the problem how an actual deployment of a VNF can be computed. In detail, this is tackled in the light of the hardware heterogeneity problem. This arises as realistic datacenters contain multiple types of servers with very different performance characteristics due to continuous upgrades and replacements. If a VNF is to be installed in such a datacenter, the requirements specified in the VNF description template for the different software modules must be fulfilled in order to achieve the specified performance. Thus, to compute an actual instance of a VNF, the right hardware has to be found which fulfills or over-fulfills the specifications given by the template for the different modules. This can be problematic if the specified hardware is unavailable or only hardware with higher performance is installed and thus capacity is wasted.

According to one embodiment the solution comprises obtaining one or more m key performance indicators (KPI) that specify the required overall performance of the VNF. This can be defined by some network operators as a requirement. Then there are obtained n performance characteristics for available types of execution units. These n performance characteristics may be provided by the provider/vendor of the virtualization environment, which has investigated the performance characteristics for the available execution units (i.e. the machines available in e.g. a cloud). The performance characteristics and the KPIs then form the basis for the "deployment plan", which specifies the number and types of execution units of the actual deployment of the virtualization in such a manner that the joint performance of VNF modules running on these execution units based on the KPI and the n performance characteristics such that the joint performance of the VNF modules running on these execution units achieves the required overall performance of the VNF as defined by the KPIs.

The embodiment therefore based on KPIs (which come from requirements from the network operator) and the performance characteristics produces a "deployment plan" which can be instantiated e.g. by a cloud management system.

For that purpose the embodiment may comprise a VNF descriptor or VNF description template which "maps" the hardware performance parameters of the available hardware (e.g. GFLOPS, RAM, etc.) against the KPIs. Such a VNF descriptor mapping may be provided by the vendor of the virtualized service.

Based on the VNF descriptor and the KPIs received from the virtualization request then there can be performed according to one embodiment a "mapping" which maps the KPIs against the performance characteristics of the hardware. This may result in a plurality of possible mappings, each then resulting in a possible deployment plan which can be instantiated by a cloud management system.

According to an embodiment the approach is suited for VNFs that process multiple independent network connections (for the case of an S-GW called bearers) in parallel. Note that a lot of functions under discussion for virtualization like EPC nodes, firewalls, or broadband remote access servers (BRAS) fall into this category.

The processing of connections' packets requires a certain fraction of the available resources (e.g. RAM, CPU cycles, network capacity). VNF modules thus do not process a single monolithic workload, but rather a collection of smaller workloads, the connections. We exploit the modularity of the workload to adapt the amount of connections a VNF module processes to the available hardware by computing this at deployment time. To achieve the overall performance requested for a VNF, the number of VNF modules is then scaled accordingly.

For that purpose the embodiment consists of three components:

1. The processing required for realizing a deployable VNF template or a VNF deployment plan based on a customer or operating support system (OSS) request. This processing takes into account the requested application layer performance (the KPIs) and the available hardware resources (the performance characteristics). Existing approaches require searching for suitable hardware that fits to predefined requirements of the software and deploying a predefined topology. In contrast to that, the proposed approach adapts the VNF—the number of modules and its topology—to the available hardware.

2. A multidimensional table in the VNF descriptor that provides a mapping of n hardware performance parameters (e.g. GFLOPS, RAM, IO capacity) to m application level key performance indicators (KPIs) like, for example, the number of bearers supported and the target throughput in Gbps. This allows describing the relation of hardware to achieved performance in an abstract way and makes the outlined adaptation of the software to the available hardware easier and more flexible.

3. The steps and message flows necessary for realizing the actual computation and embedding.

Such an approach has the following advantages:

It exploits the hardware heterogeneity that is present in datacenters, by adapting the VNF deployment to the available hardware, thus improving the overall resources usage.

As the approach adapts the amount of connections a VNF module processes to the available hardware, one can also create an embedding where traditional approaches cannot come up with a solution, e.g. for cases where the hardware does not provide the very amount of resources a traditionally specified VNF would request.

With the design of a multi-dimensional table in the VNF descriptor template that maps resources (performance characteristics) to achieved performance (KPIs), it is possible to calculate an embedding for a server configuration that has not been measured by the vendor of the VNF. Thus, the VNF deployment is more flexible and future proof.

An indirect aspect of this approach is the ability to reuse the OSS (which will be described later) as NCP (which will also be described later) performs the virtualization specific management tasks.

This saves cost as it minimizes changes to the legacy OSS.

Now some further embodiments will be described in more detail.

1.1 System Architecture

Figure 2:
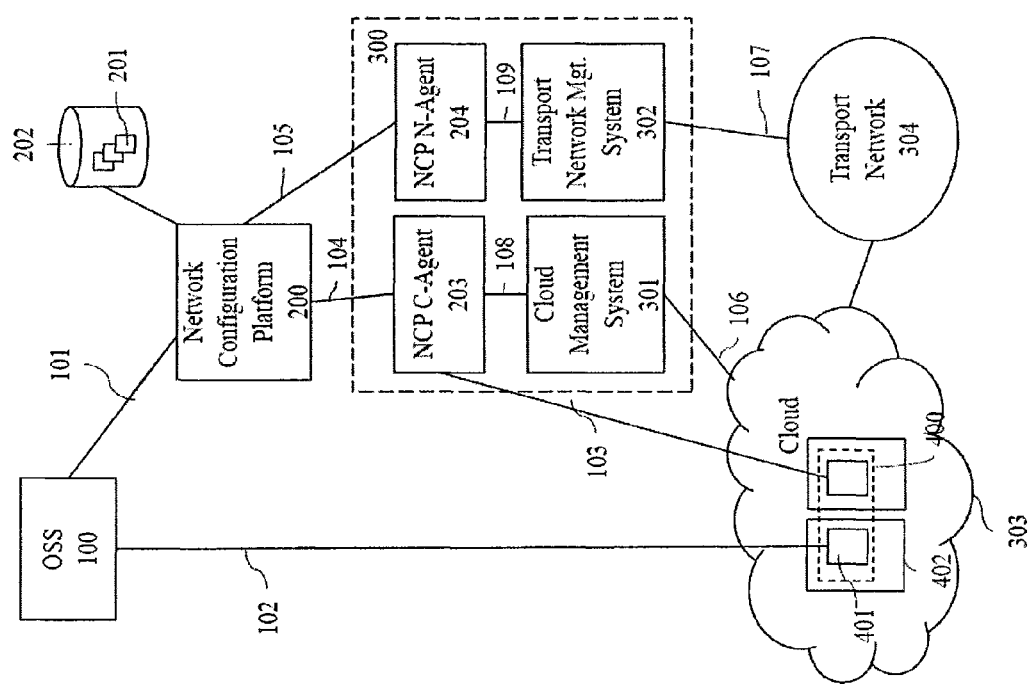

An overall system architecture is shown in FIG. 2 together with the reference points among the relevant elements. The first element is the operating support system (OSS) 100. It is responsible for the network provisioning service, configuring and managing network components, and account maintenance and billing. Current OSS/BSS are not virtualization-aware. In order to provision a plurality of virtual network functions 400, the OSS interacts with a Network Configuration Platform (NCP) 200. The NCP is responsible, among other operations, for computing the VNF deployment, triggering the deployment and managing the overall virtualization lifecycle. In this architecture, two new entities have been introduced, the NCP cloud agent 203, which can be physically co-located with the cloud management system (CMS) 301, and the NCP network agent 204, which can be physically co-located with the transport network management system (NMS) 302. These agents perform NCP related actions and computations that need up-to-date information on hardware resource usage in the cloud and the network. It should be noted that the NCP can also be seen as a single entity comprising elements 200, 203, 204.

A VNF instance 400 is composed of one or several VNF-modules 401, and these modules are implemented either as pieces of software or virtual machine images 402. In this specific embodiment, we show an example wherein the VNF 400 is composed of two VNF-modules 401 contained into two respective VMs 402. To realize the proposed solution, the NCP interacts with cloud and network management systems. The CMS 301 is responsible for managing through interface 106 the physical and virtual infrastructure resources in the Cloud 303, which may include computing, storage and intra-cloud network connectivity resources. The instantiation of VNF involving a multi-cloud environment requires also the assistance from the NMS 302, which is able to manage through interface 107 the connectivity of the transport network 304 interconnecting such clouds. Finally, the VNF description templates 201 are stored in a database 202 or data repository to which NCP has write and read rights.

1.2 Templates and Processing

To achieve the actual implementation of the virtualization there is computed a VNF deployment plan that is adapted to the available hardware resources. Before outlining this process, first the types of templates used in this embodiment are described.

1.2.1 Template Types

VNF description template: The description template provides an abstract description of a VNF and contains information on how the VNF is implemented, its requirements, the amount of performance that can be achieved depending on the provided hardware resources, and so on. It cannot be directly instantiated but needs to be adapted to the hardware at hand, as well as to the requested performance.

VNF construction plan: The construction plan is a temporary template that is used while computing the final deployment template and it is a result of the combination of a VNF description template and the input parameters and requirements (KPIs) received from a user/OSS request and the intermediate NCP (and NCP agent) computations.

VNF deployment template: The deployment template is the result of the VNF template computation and it contains information that a cloud management system can process in order to realize the actual instantiation of the physical resources and assign the software and/or VM images.

1.2.2 Construction Plan Computation

Figure 3:
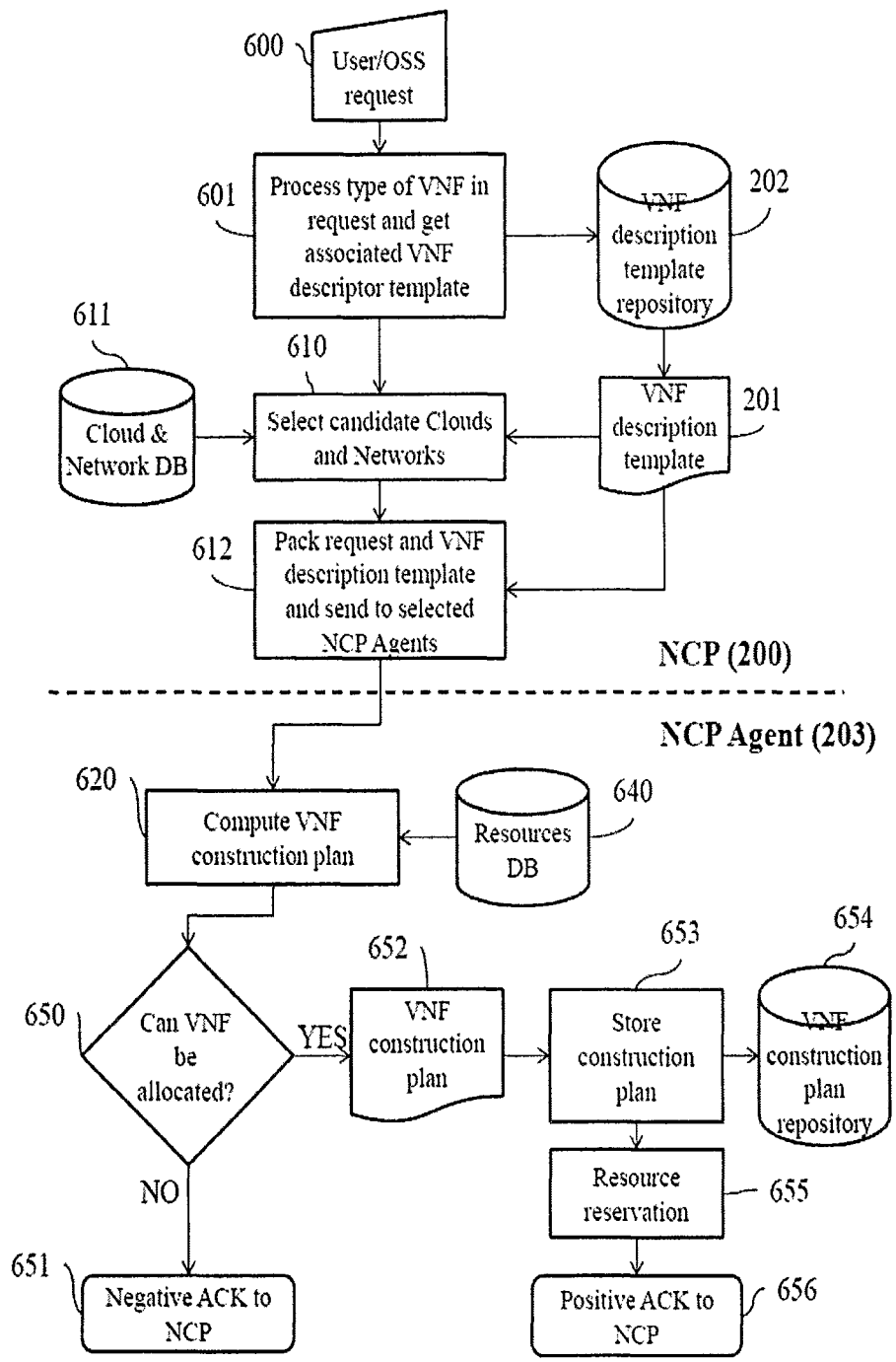

FIG. 3 shows the hardware adaptable VNF instantiation process according to one embodiment. It starts by receiving a VNF request 600 from the OSS. The request determines the type of VNF to instantiate and contains a number of key performance indicators (KPIs) for this function. NCP looks up the correct VNF template 201 from the VNF template repository 202. Based on the information contained therein, e.g. on the hardware architectures or other similar parameters, and on the information on the different available clouds and networks from database 611, the NCP selects candidate clouds and networks and splits the computing and networking resources request accordingly in step 610. This information is then properly distributed to the selected NCP agents as shown in step 612. The NCP agent 203 is then responsible for computing an appropriate embedding of the requested resources in step 620. Note that the adaptation of the VNF to the available hardware is performed in step 620, which is outlined in detail later on.

The result of the physical resources mapping computation may fail or succeed as specified in step 650. If the mapping is not successful, the request may be withdrawn and NCP is notified 651. If it is successful, the construction plan 652 is stored 653 into a temporary repository 654, and the resources for this request are booked 655 in order to avoid future reservation conflicts with other requests. NCP is informed about the outcome of the operation as in step 656 and can then decide which of the different embedding offers by the different clouds (requested in step 610) to take, e.g., by maximizing a certain utility function or choosing the offer with the lowest cost. Then, by using the provided CMS/NMS interfaces, the NCP agent executes the required commands to create the requested virtual resources in the chosen cloud or transport network.

Figure 4:
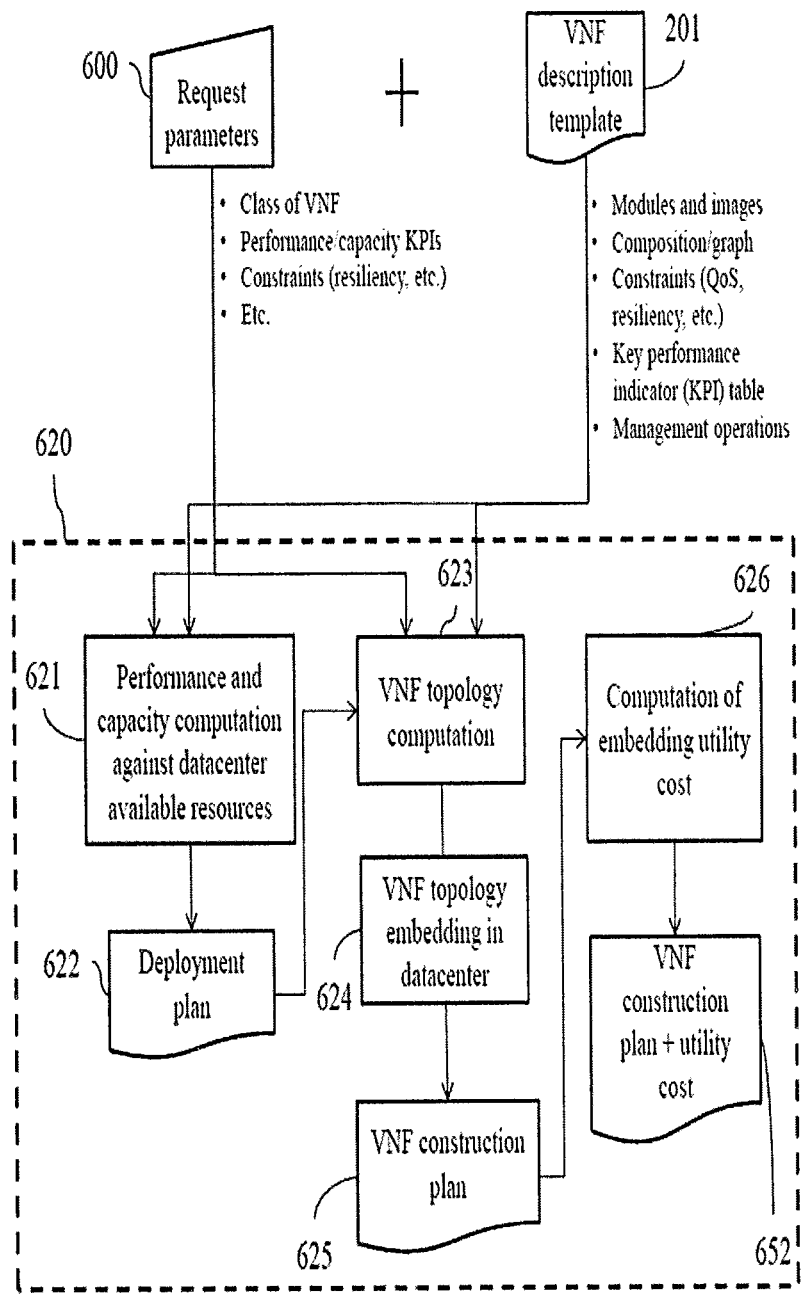

FIG. 4 shows a detailed description of VNF construction plan (or VNF deployment plan) computation 620 according to one embodiment. As outlined above, the input to this process is a request with a list of KPIs 600 and a VNF description template 201 (the "performance characteristics").

The request 600 shall according to one embodiment contain at least information about:
  The class/type of VNF to be instantiated, e.g., a new 3GPP-compliant serving gateway (S-GW).
  A number of KPIs, i.e., the performance and/or capacity required.

An example for such a request may specify that the requested S-GW must be able to process $10k$ bearers per second and provide a peak throughput of 50 Gbps.

Additional parameters of request 600 (which may also be called "KPIs") according to one embodiment can be:
Constraints:
1) on resiliency, specifying that the S-GW shall have a resiliency level in the order of 99.999% availability;
2) on the geographical location/area of the S-GW; and so on.
  Other parameters that shall help define better the VNF to choose from the VNF descriptor template repository.

The following steps are then performed in the computation by the NCP Agent 203:
1. The NCP Cloud Agent checks what kind of servers are available and determines the hardware resources these servers provide. By using the multidimensional table from the VNF description template that provides a mapping of hardware resources to KPIs (which according to a specific embodiment is described in more detail in Section 1.4), it calculates in step 621 how much a server of each type contributes to the KPIs. This is done by a simple table lookup, i.e., the values closest and smaller to the ones provided by the hardware are queried, and the KPIs per server are thus derived.

2. For each server type, then the NCP computes and generates a deployment plan as in step 622, i.e., it computes how many VNF-modules need to be instantiated to reach the overall requested KPIs.

3. Based on the topology information for the VNF-modules contained in the VNF description template, the NCP C-Agent first computes a topology for this VNF as shown in step 623. Then, it derives the parameters for the links between the different VNF modules. After knowing how many connections are processed by a certain module and thus server, it is possible to determine the amount of traffic that each module generates and consumes, and with that to dimension the links appropriately.

4. After that, the NCP agent computes as in step 624 an actual embedding and construction plan 625 for this topology in the datacenter by taking the currently available datacenter resources into account.

5. In the last step 626, the "utility"/cost of the embedding is computed, e.g. by summing up the expected cost and electricity consumption of this deployment.

6. The result is a VNF construction plan 652 which contains information about the cost (or function utility) of embedding this VNF in the Cloud datacenter.

1.3 VNF Description Template

How a VNF shall look like is described in a VNF descriptor template 202, i.e., the template describes the VNF. A VNF template models the logical behavior of the VNF at pre-deployment and during runtime.

That is, according to one embodiment a template defines both, how a VNF is defined in terms of topology, manageability, and requirements, and once instantiated, it defines the mechanisms by which the VNF can be operated during runtime. There may exist multiple templates to realize the same VNF, for instance, for different release versions or tested module configurations. VNF descriptors or description templates may be provided by the VNF's vendor/implementer together with the corresponding software packages. In the following the focus will be on the aspects of a VNF description template that relate to the proposed hardware adaptability.

VNF description templates according to one embodiment contain the following attributes:
  Modules. It defines the VNF-modules 401 that make up the VNF. For instance, a 3GPP S-GW VNF may be composed of three modules: a load balancer, a bearer processor, and a tunnel encapsulation unit. It may also happen that a VNF is composed of a single module. Module information references to compiled programs and/or virtual machine images. Furthermore, note that each module may be instantiated multiple times in an already deployed VNF.
  Composition. This attribute defines the interconnection of the VNF modules, i.e., the input and output VNF-modules a particular module is attached to. It can be represented as a graph of vertices (modules) and edges (network links between modules). As example, consider the composition of the S-GW VNF: a load balancer connected to k bearer processors in a 1:k topology, the k bearer processors being connected to the tunnel encapsulation unit in a k:1 topology. This sequence means that the input from a bearer is the output from the load balancer, and the output of the bearer processor is the input for the tunnel encapsulation unit. In one embodiment, the VNF composition is not a static specification, but allows for different multiplicities, e.g. by connecting one or multiple bearer processing module to a single load balancer.

Resiliency. This attribute provides additional information to the VNF composition for resiliency purposes. In particular, for each of the VNF-modules comprising a VNF, it details how resiliency is provided (what model, e.g., active-backup or active-active configuration). Notably, this shall contain useful information to determine where the backup modules are to be deployed, for instance, in order to not share specific physical resources with the main and working modules. The resiliency configuration has implications on the overall VNF-module planning, placement and interconnectivity.

Resources. This attribute provides information about the KPIs the different components can achieve based on the hardware resources provided. An embodiment of it will be described in detail in the following Section 1.4.

Version. This attribute defines information about the software or virtual machine image version of the VNF.

1.4 Resource:KPI Mapping Table (of the VNF Description Template).

As outlined above, the performance that certain modules achieve depends on the provided hardware. This relationship is specified in the resources parameter of the VNF descriptor template as multidimensional table. Note that this turns the existing paradigm "hardware follows software" upside down: instead of giving hardware requirements for a module, there is provided a means to calculate how much performance a module achieves based on the provided hardware resources.

Figure 5:
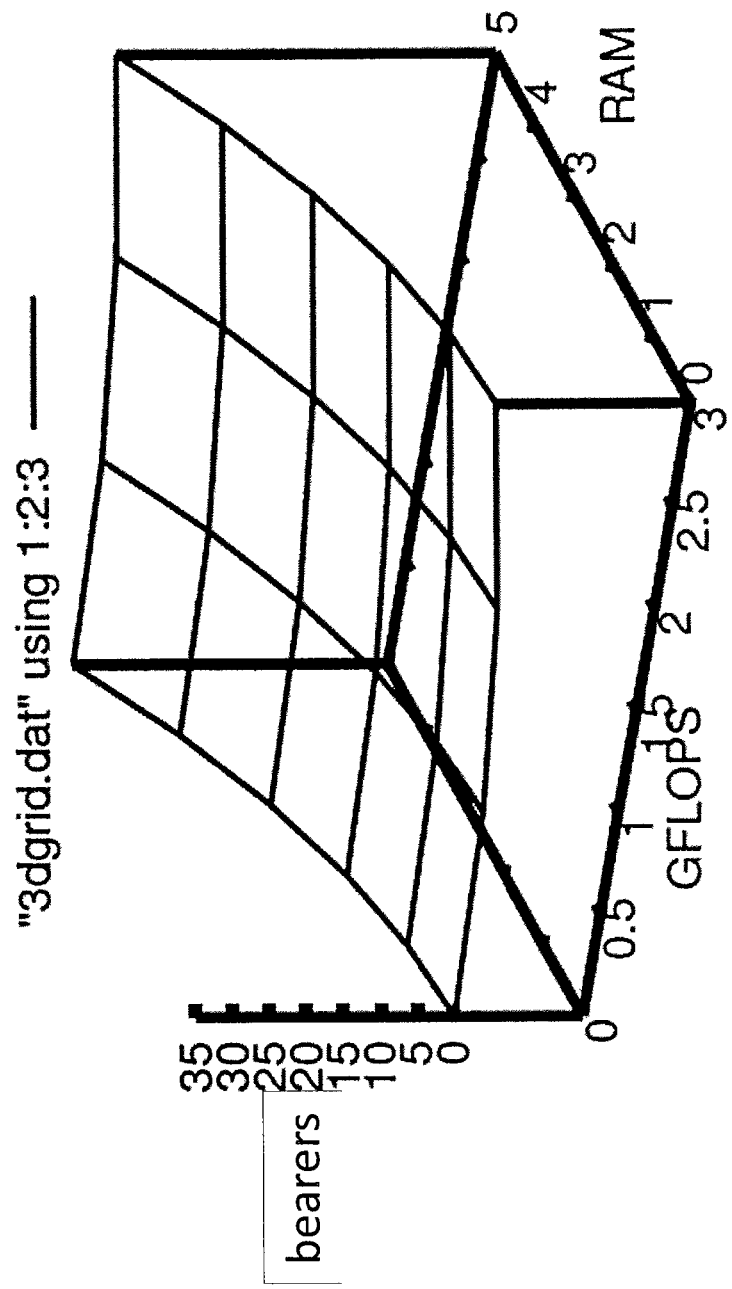

The resource:KPI table provides a mapping of n hardware performance parameters (e.g. GFLOPS, RAM, IO capacity) to m application level key performance indicators (KPIs) like the number of bearers supported and the target throughput in Gbps. A visualization example of this concept (with a 2:1 mapping) is shown in FIG. 5.

The mapping table will avoid defining specific resources, like CPU architecture and version (e.g., whether it is an Intel i5 or i7 processor), but rather use abstract parameters like GFLOPS, RAM, amount of level 1 cache, and so on. For example, such an abstraction allows to compute an embedding also for new processors that did not exist at the time the corresponding VNF and mapping tables were created.

Another aspect is the fact that according to one embodiment the NCP might store the mapping table and adjust the contained values once a VNF has been deployed. In this manner there can be implemented a self-learning feature in NCP that acquires knowledge on the actual resource:KPI mapping that the modules achieve under real world workloads. This can be important as the traffic trends in the Internet change quite quickly, and because of this, the module performance could change.

As an example, one may consider a change in the average packet size occurring due to a higher amount of video consumption. A VNF-module might thus need less CPU resources to process the same amount of Gbps, as it only needs to process the packet headers, and their number reduces in this case.

To this end, NCP may thus store a copy of the mapping table and combine feedback on the modules' performance from both CMS (that provides information on the hardware side) and the VNF itself (that provides information on application level parameters). To compute an embedding according to 620, NCP can thus use the updated values from the stored table, instead of the ones provided by the vendor's VNF description template.

1.5 Data Structures

The method of processing the VNF templates and computing the VNF deployment template according to one embodiment uses two main database and/or repositories. The first database is the VNF description template repository 202. The repository lists the description templates that the NCP is able to instantiate.

Queries are performed to this repository and can be based on one or several parameters. For instance, the query for a VNF may specify a specific VNF vendor with a specific standard compliance. Table 1 shows a realization example of a VNF description template repository.

TABLE 1

Formatting example of VNF description template repository

| Entry | Type | Vendor | Version | Standard |
|---|---|---|---|---|
| 001 | S-GW | Vendor 1 | 1.0.0 | 3GPP Rel. 10 |
| 002 | S-GW | Vendor 1 | 1.1.0 | 3GPP Rel. 12 |
| 003 | Firewall | Vendor 2 | 0.9.0 | N/A |
| 004 | MME | Vendor 3 | 2.0.0 | 3GPP Rel. 12 |
| ... | ... | ... | ... | ... |

The second database contains information about the physical resources 611, see Table 2 for an example.

TABLE 2

Example of NCP cloud and network resources database

| ID | Type | Location(s) | Management System | Resources Table Pointer |
|---|---|---|---|---|
| 0x01 | Cloud | Location 1 | IP address #1 | Table pointer 1 |
| 0x02 | Cloud | Location 2 | IP address #2 | Table pointer 2 |
| 0x03 | Network | Locations 1, 2, 4 | IP address #3 | Table pointer 3 |
| ... | ... | ... | ... | ... |

The NCP has knowledge about several cloud and network resource domains. However, the level of detail is low and only contains summarized information about the inventory of available resources, e.g. the type of servers available in a certain cloud. Specific tables exist for such cloud and network resource descriptions, which are linked from Table 2, examples for this are shown in Table 3 and 4.

TABLE 3

Formatting example of NCP cloud resources table

| Class | Type | Sub-type | Capacity | Usage |
|---|---|---|---|---|
| Computing | CPU | IA64 | X GFlops | 60% |
| Storage | Volatile | RAM | Y GBytes | 40% |
| Storage | Permanent | SSD 3 | Z TBytes | 30% |
| Computing | CPU | i7 | X2 GFlops | 20% |
| ... | ... | ... | ... | ... |

TABLE 4

Formatting example of NCP network resources table

| Domains | Layer | Virtual Technology | Capacity | Average Link Usage |
|---|---|---|---|---|
| Domains 1, 2, 4 | Layer 2.5 | VPLS | X Tbps | 40% |
| Domains 1, 2 | Layer 3 | VXLAN | Y Tbps | 40% |
| Domains 3, 1 | Layer 2, 3, 4 | VLAN, GRE | Z Gbps | 30% |
| ... | ... | ... | ... | ... |

To compute the VNF construction plan in 620, the NCP also needs access to the cloud local resource database 640. This database contains up to date information on the exact load situation in the current datacenter, i.e. which server is used and which is free, what is the network load etc. This database can be the same that the CMS uses to control the cloud. Note that read access is sufficient for the purpose to be achieved as the actual embedding or implementation on the execution units will be performed via the CMS. As the database is local to the datacenter and its contents are updated frequently, there is proposed the concept of an NCP C-agent that is collocated with the CMS/this database for getting direct access to up-to-date information. An example is shown in Table 5.

The NCP C-Agent needs information about the abstraction of resources, e.g., how many GFlops a specific CPU model provides. This can be contained in this table, or it might be stored somewhere else.

TABLE 5

Formatting example of NCP C-Agent cloud resources table

| Host | CPU model | Avail. vCPU | Avail. Memory | Avail. Storage | Status |
|---|---|---|---|---|---|
| Server 1 | Intel Core i7-2600K | 6 | 2 GB | 1 TB | ACTIVE |
| Server 2 | Intel Core i5-3470 | 4 | 4 GB | 1.5 TB | ACTIVE |
| Server 3 | Intel Xeon X3430 | 8 | 8 GB | 3 TB | ERROR |
| ... | ... | ... | ... | ... | ... |

1.6 VNF Initialization Flow Chart

Figure 6:
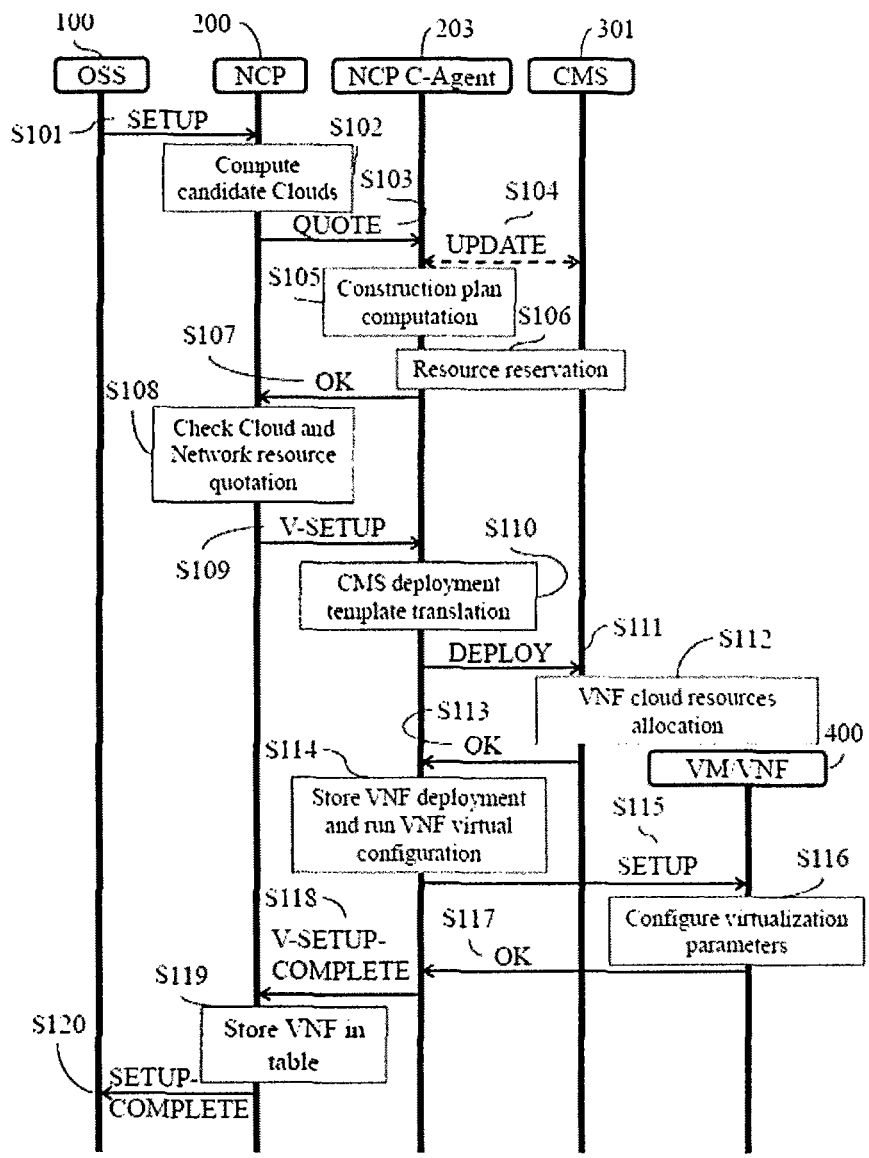

FIG. 6 illustrates an example of a sequence for initializing a virtualized network function 400 composed of at least one VNF-module 401 running in at least on one VM 402. In step S101, the operating support system instructs the network configuration platform to setup a new VNF. This step comprises the transmission over the OSS-NCP interface of a SETUP request message 600. This message includes information about, not exclusively, the type of network function to setup, the desired capacity of the network function, login credentials from the OSS and requirements including at least geolocation data. Upon receiving the SETUP message 600, the NCP (200) processes the message. In step S102, the NCP loads the appropriate template 201 from the repository (202) for the type of VNF requested in the previous message. Based on the template data and the capacity and requirements expressed by the OSS in the setup message, the NCP computes the candidate clouds as in step S102.

The next step involves sending a QUOTE message to the selected Cloud, and in particular to the corresponding NCP C-Agents 203. Upon receiving the QUOTE request, the agent may execute an on-demand update of the resources available in cloud by consulting the CMS as in step S104. After this optional step (i.e., the agent may run periodic updates too), it executes the procedure 620 as shown in step S105 to compute the construction plan together with the utility cost of the VNF embedding on the available Cloud resources. In order to avoid conflicts for subsequent requests, the agent makes a reservation of the resources planned in the embedding computation S106.

Then, the agent sends back a message to the main NCP with the results of the VNF embedding as in step S107. Upon this, the NCP can check in step S108 the cloud and network resource quotations of at least from one NCP agent, and choose where the VNF will be finally instantiated. Therefore, it sends a V-SETUP message S109 to the chosen agents. These may have to run a specific VNF deployment template translation according to the corresponding CMS interface APIs as specified in step S110.

After this, a DEPLOY command S111 is send to the CMS, which allocates the physical and virtual resources for the new VNF 400 as shown in step S112. After receiving the confirmation from the CMS (see OK message S113), the agent stores the VNF deployment and runs any specific VNF virtual configuration towards the VNF according to steps S114, S115, S116, and S117.

The final steps of the VNF instantiation include the V-SETUP acknowledgement from the NCP agent to the NCP (see step S118), which can then store the results of the instantiation S119. Once all these steps have been completed, the NCP sends in step S120 a SETUP-COMPLETE message to the OSS to inform that the deployment and boot-up of the network function has been completed and it should from now on be operationally managed by the OSS.

1.7 Interfaces

In the described embodiments the following interfaces are used (cf. FIG. 2):

NCP C-Agent to CMS (108): this interface uses existing commands to deploy and instantiate virtual machines using a cloud manager. Existing cloud management system, e.g., OpenStack, Amazon's EC2, etc. already offer application programmable interfaces (API) which enable the instantiation and management of virtual machines.

NCP N-Agent to TMNS (109): this interface use existing APIs to access network-wide management systems and which are used to request for connectivity across the network. Associated with the management of transport network resources, interface 109 is neither claimed, nor described in this invention. Such interface is used by more specific element management protocols to configure network elements, e.g., switches, routers, etc.

OSS-VNF (102): this interface shall remain the same (or be largely based) on current element and network management interfaces used for managing hardware-based network functions. The interface is primarily used for managing the logical service performed by the network management, i.e., specific function management parameters.

In addition the following new interfaces/modifications to existing interfaces are provided:

OSS-NCP (103): via this interface, the OSS makes request concerning the lifecycle of VNFs from NCP. Examples are the instantiation of a new VNF, or updating the VNF capacity (e.g. increase/decrease the amount of bearers that an S-GW can process). New parameters might be as follows: request (S101) contains at least KPI (e.g. amount of bearers and summarized load) and location (either geographic, or in terms of network latency) where VNF is to be located.

NCP-VNF (111): a new interface that interconnects NCP to the virtualization management logic of the VNF (e.g., a specific VNF-module that manages the other modules of a VNF). Via this interface, NCP informs the VNF and its modules about its virtualized environment, i.e. the mapping "VNF-module to hardware platform" to calculate the maximum amount of sessions that can be allocated to this module.

NCP—NCP-C-agent (104): the quote request (S103/612) contains the request parameters (KPIs from the OSS . . . ) and the VNF descriptor template to be instantiated. The reply message provides the cost respectively the utility of embedding the VNF in the cloud to which the request has been sent and a timer how long a quotation is valid.

1.8 Example Use Cases

In the following there will be described possible use cases of embodiments of the invention.

1.8.1 Single-level Load Balancer

Figure 7:
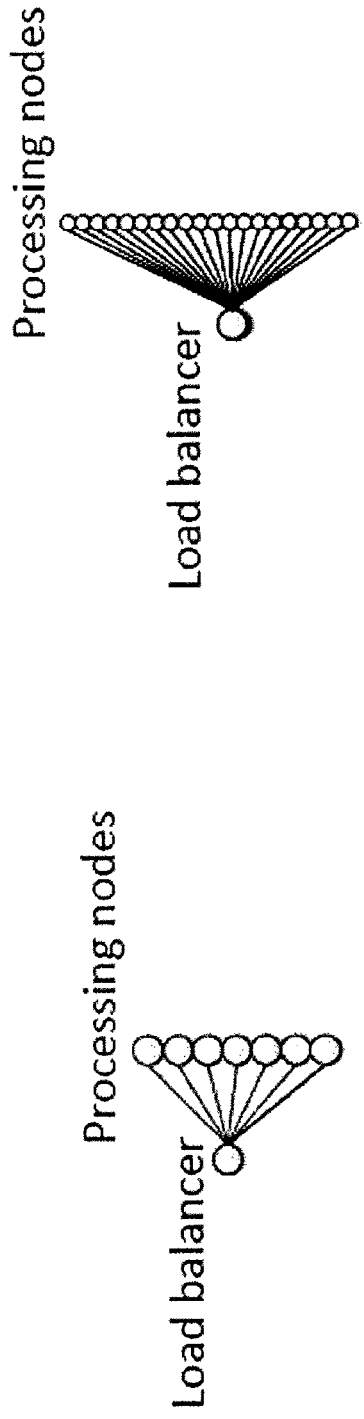

The first use case is the one shown schematically in FIG. 7. In this architecture, the VNF is responsible to process a certain amount of traffic, and to the outside world the details of the VNF are hidden behind a load balancer that serves as single entry point. The left hand side of the figure shows the deployment in case powerful servers are available: only few processing nodes are necessary. The right hand side of the figure shows it for servers with less processing resources: in this case, much more processing nodes will be instantiated by the described computation and signaling in order to achieve the overall same performance.

1.8.2 Multi-level Load Balancer

Figure 8:

The embodiment in FIG. 8 shows how devices with different capabilities can be combined and appropriate scaling can be computed. Also here, there is depicted a scenario where a number of processing nodes are to be deployed behind a data plane load balancer, but now focus on the load balancer.

The data plane load balancer should be able to forward packets depending on the four tuple of source IP address, destination IP address, input port and output port.

In the case outlined on the left side of the figure, a single switch (e.g. an OpenFlow switch) is available that is able to hold the requested amount of entries and is also able to match four protocol fields per entry. Thus, a single switch is sufficient as data plane load balancer. The right side of the figure shows the case when such a powerful switch is not available.

In this example, there are a number of small switches available that can match the requested four protocol fields but are not able to hold so many entries, or a single switch exists that can hold all entries but is not able to match all protocol fields. In this case, through the adaptation of the deployment to the available hardware, it is possible nevertheless to compute an embedding that combines a single big, few-field-matching switch with a number of small ones that can match all requested fields.

It should be noted that for such a computation by an embodiment, the VNF description template should contain information on how such an adaptation can be performed, i.e. it should contain information on the different possible deployment options (option 1: a single big switch that matches all fields; option 2: a hierarchical deployment of a single big switch that matches a subset of all fields paired with a number of small switches that can match all fields).

1.8.3 Scaling the Control Plane

Figure 9:
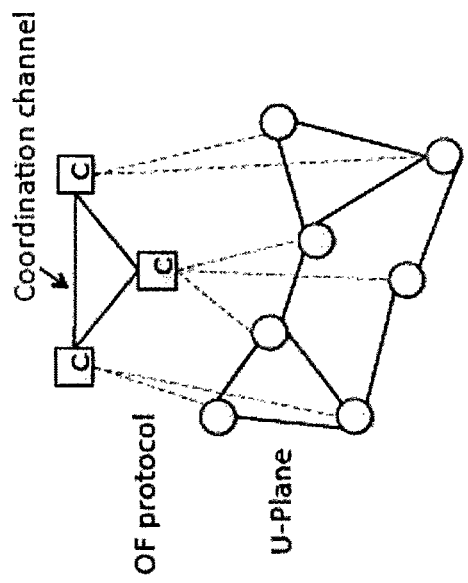
Figure 9:
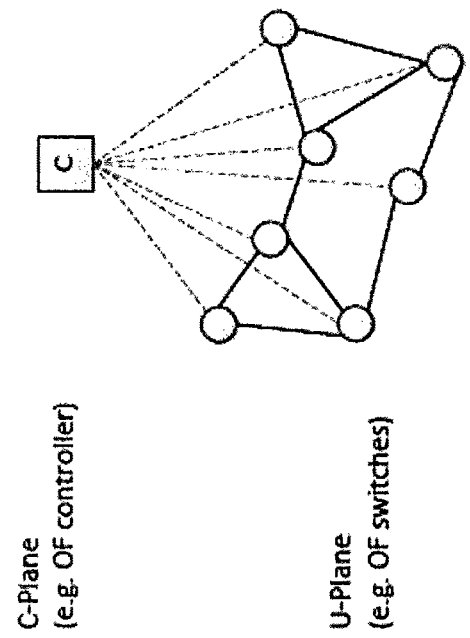

A third application example is given in FIG. 9. Here, a network of OpenFlow (OF) switches should be controlled by an appropriately dimensioned control plane (C-plane), the specified KPI being the amount of messages it can process per second. The capability of a server to process such messages relates among others to its CPU speed and to the speed of its network interface. In case a single server does not provide enough CPU or interface speed, the VNF description template specifies that one or multiple additional servers are to be combined, and an additional coordination channel among them is to be established to allow them to e.g. exchange network topology information. On the left hand side of the figure, the case with a single powerful server is shown. The right hand side shows a deployment where multiple less powerful servers are combined.

After having described several quite detailed embodiments, there will be now illustrated some more basic embodiments and the reasoning behind them.

Figure 10:
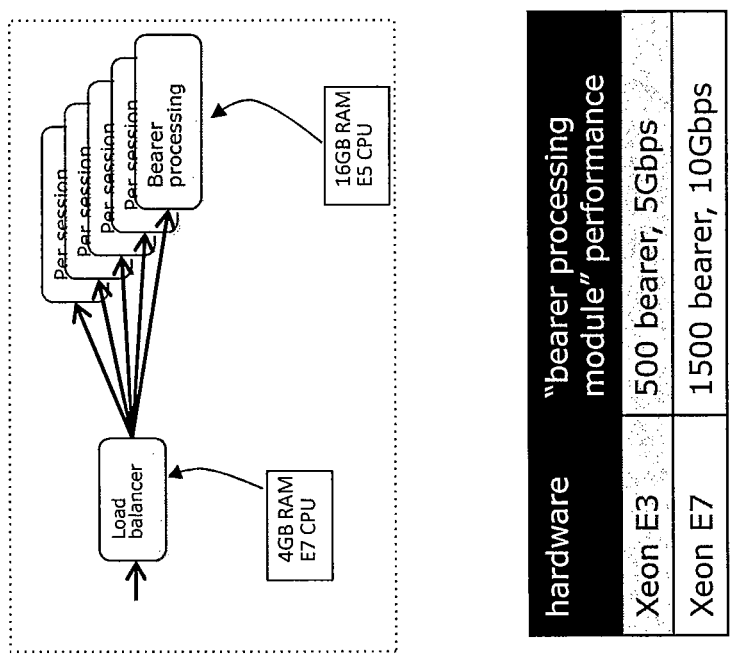

At first FIG. 10 illustrates in the upper part the "old approach" which is based on "hardware follows software" paradigm, e.g. by stating that there is required an E7 CPU with 4 GB RAM for the load balancer and an E5 CPU with 16 GB RAM for the bearer processing. Based thereon the old approach would implement the virtualization.

The "new approach" illustrated below takes into account the "performance characteristics", e.g. that a E5 can process 500 bearers at 5 Gigabits per second, and an E7 can process 1500 bearers at 10 Gbps. This "performance characteristic" which indicates the performance of the available hardware in terms of KPIs allows to choose a more flexible virtualization which furthermore is open for optimization.

Figure 11:
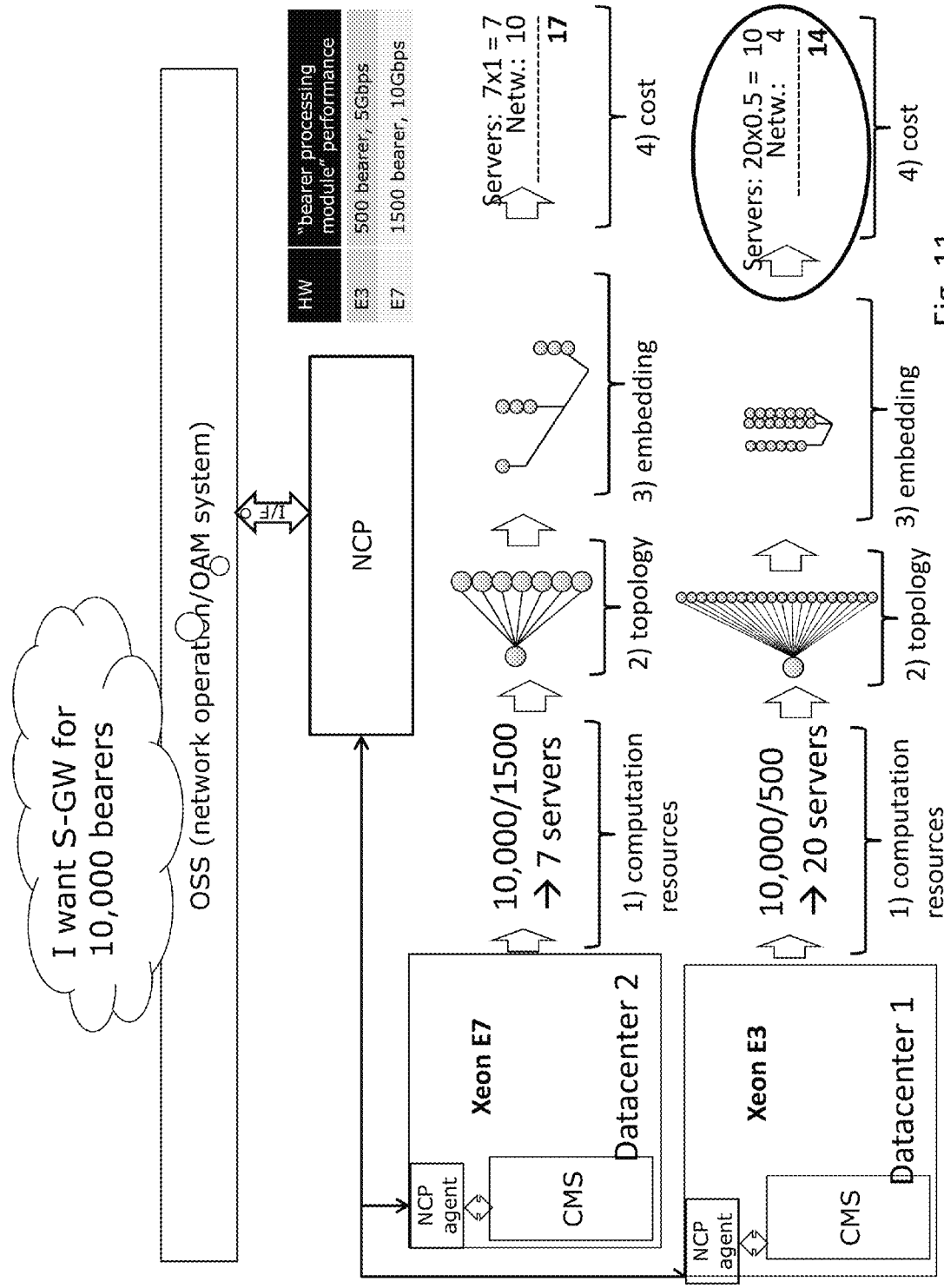

FIG. 11 illustrates how this approach can then be implemented in more detail. Based on a requirement of a S-GW for 10,000 bearers (e.g. from a network operator) the NCP looks up possible VNF descriptions and their corresponding KPIs. This results in two possible implementations, the "upper one" requiring seven servers, and the lower one requiring 20 servers based on the performance characteristics of the VNF implementations based on the available hardware.

What then is taken also into account is the corresponding network topology of the different implementations. In the upper one there is a 1:7 mapping of the load balancer to the bearer processing (because of seven servers), in the lower one there is a 1:20 mapping.

Based on the network topology of the actual embedding the concrete implementation in the upper example is more "distributed" than the lower one (cf. the more distributed VNFs in the upper part of FIG. 11 than in the lower part), leading to more networking resources being required. This may then influence a "cost function" calculated by the virtualization vendor negatively, so that the more advantageous embedding in terms of the cost function in the example of FIG. 11 is the lower example.

Figure 12:
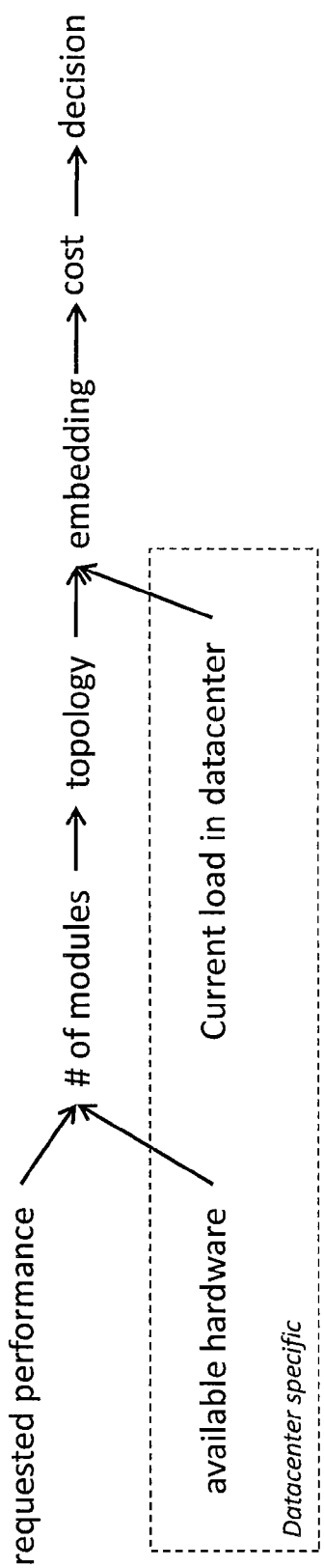

FIG. 12 illustrates another embodiment of the computation flow according to the present invention. The requested performance (the KPIs) and the available hardware with their "performance characteristics" which maps the hardware parameters to KPIs are inputted and then the number of necessary modules is calculated. Then the topology is taken into account and the embedding with the corresponding network requirements is computed. Then finally a cost function is calculated for the various possible embeddings and then the most effective one is chosen and implemented.

Figure 13:
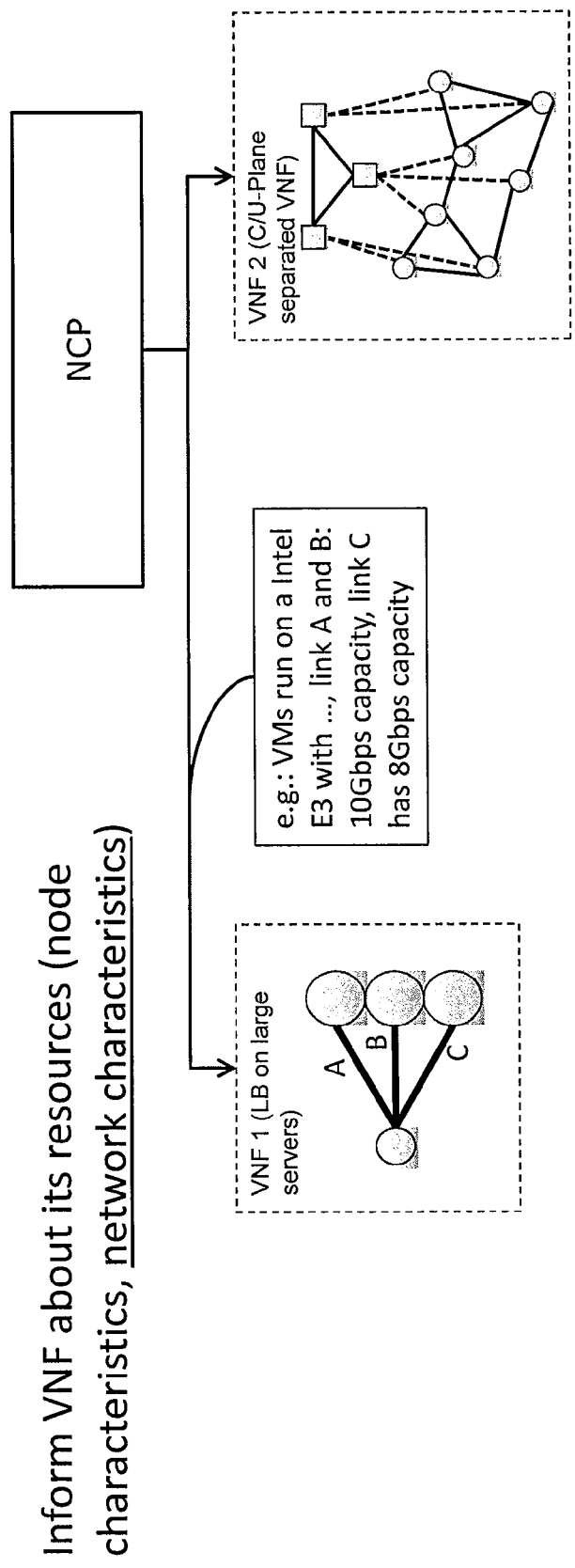

FIG. 13 illustrates an embodiment according to which a VNF module is "informed" about its resources, e.g. about its node characteristics and its network characteristics. In this embodiment the VNF shown on the left implements a load balancer, while the right-hand one implements a bearer processing. In this embodiment, after the VNF has been instantiated, it is informed about the resources that have been assigned to it in order to correctly dimension the load that is forwarded to each VNF module. This can be decomposed in "compute" (inform the VNF about the hardware resources assigned to the different VNF modules) and "network" (inform the VNF about the parameters of the links that have been reserved to interconnect the VNF modules).

An example is shown in FIG. 13, here NCP informs the VNF that link C has less capacity than links A and B (and thus the VNF most likely will assign also less load to the node attached via C). One may assume that each VNF has a dedicated "VNF manager module" that receives this information.

According to one embodiment there are provided the following interfaces:

NCP-VNF (111): a new interface that interconnects NCP to the virtualization management logic of the VNF (e.g., a specific VNF-module that manages the other modules of a VNF). Via this interface, NCP informs the VNF and its modules about its virtualized environment, i.e. the mapping "VNF-module to hardware platform" to calculate the maximum amount of sessions that can be allocated to this module. Via interface 111, NCP informs the VNF management module about the resources that have been allocated to its VNF modules.

In terms of computing resources, this information could be the number of CPU units, type of CPU unit (virtual/physical), CPU flags, CPU cache size, CPU frequency, CPU model, CPU architecture (32/64 bit), amount of volatile memory (RAM), network interface card model . . .

In terms of networking resources, this information describes the specifics of the links interconnecting the VNF modules: link bandwidth, link latency, resiliency, traffic loss . . . but can also contain information how to use the links, e.g. which header flags to set in the transmitted packets, or which address space can be used (and which not).

OSS-NCP (103): via this interface, the OSS makes request concerning the lifecycle of VNFs from NCP. Examples are the instantiation of a new VNF, or updating the VNF capacity (e.g. increase/decrease the amount of bearers that an S-GW can process). New parameters in this embodiment might be as follows: request (S101) contains at least KPI (e.g. amount of bearers and summarized load) and location (either geographic, or in terms of network latency) where VNF is to be located.

In the following there will be described the 1:k mapping according to one embodiment.

As shown e.g. in FIG. 7 with the different implementations of a load balancer, the amount of resources for the links also depends on the computed topology and on the amount of supported KPIs of the VNF modules that the links interconnect.

In the example, this is visualized by thicker lines for the 'large servers' example (the one with the fewer links): the single links needs more bandwidth than the links in the 'small servers' example (the one on the right-hand side of FIG. 7).

To describe the VNF topology in the VNF descriptor template, according to one embodiment there are needed two things:

A description of a graph to interconnect VNF modules that shows multiplicities for the links (e.g. "load balancer-bearer processor" interconnection with a 1:n multiplicity)→this is something comparable to a UML class diagram, so it does not need to be described on more detail The requirements of the links are specified in dependence on the KPIs of the attached VMs. This is done by an l:k mapping table, mapping l KPIs of the two VMs this link interconnects to k link requirements.

This 1:k mapping table may be used to define and consider the topology of a virtualization implementation.

What is claimed is:

1. A method for implementing an entity of a network by virtualizing said network entity and implementing said network entity on one or more servers each acting as an execution unit for executing thereon one or more applications running and/or one or more virtual machines running on said execution unit, each of said applications or virtual machines running on a server and implementing at least a part of a functionality of said network entity being called a virtual network function VNF module, wherein a plurality of said VNF modules together implement said network entity to thereby form a virtual network function VNF, said method comprising the steps of:

obtaining m application-level key performance indicators (KPIs) specifying a required overall performance of the VNF, obtaining n hardware-level performance characteristics for available types of execution units, determining one or more possible VNF deployment plans based on the obtained m application-level KPIs and n hardware-level performance characteristics through an n:m mapping of n hardware-level performance characteristics for available types of execution units to m application-level KPIs achieved by a VNF module performing on an execution unit of a respective type of the available types, wherein determining VNF module performance information for the available types of execution units is obtained by determining a VNF module performance on a certain type of execution unit by installing said VNF module on said execution unit, putting load on said VNF module with a traffic generator and measuring the KPIs that can be achieved without violating QoS values specified for said VNF module and/or without violating resource limits of said execution unit, each VNF deployment plan specifying number and types of execution units, such that joint performance of VNF modules running on said execution units achieves the required overall performance of the VNF, the method further comprising the steps of:

determining one or more construction plans that specify an allocation of the plurality of VNF modules to actual execution units according to one of the one or more possible VNF deployment plans, requirements for networking resources linking the VNF modules, and currently available datacenter resources; and deploying individual VNF modules of the plurality of VNF modules according to one of the one or more construction plans.

2. The method according claim 1, further comprising the step of
  determining requirements for networking resources linking the plurality of VNF modules based on topology information of the plurality of VNF modules and on KPIs of the plurality of VNF modules by an 1:k mapping which maps 1 KPIs of the VNF to k link requirements.

3. The method according to claim 1, further comprising the steps of evaluating a utility function for the one or more construction plans,
  wherein the utility function expresses expected cost and/or electricity consumption of a specific deployment of a VNF in a datacenter,
  wherein the one of the construction plans is selected according to a maximum value of the utility function.

4. The method according to claim 1, wherein the KPIs comprise performance and/or capacity of the VNF, specified in terms of a number of supported bearers and/or throughput and/or flows and/or sessions.

5. The method according to claim 1, wherein the hardware-level performance characteristics comprise hardware performance parameters, specified as GFLOPS, RAM, and/or IO capacity.

6. The method according to claim 1, wherein possible compositions of a VNF through one or more interconnected VNF modules and corresponding topology information are described by a VNF description template which is stored in a VNF template repository and which describes a VNF topology as an interconnection of nodes, wherein the interconnections specify one or more of:
  multiplicities for links; and
  interconnections between same node types; and
  interconnections between different node types.

7. The method according to claim 6, wherein the VNF description template includes a table specifying an n:m mapping of n hardware-level performance characteristics for available types of execution units to m KPIs achieved by a VNF module performing on an execution unit of a respective type of the available types, and/or an 1:k mapping for the links.

8. The method of claim 6,
  where the VNF description template contains for each VNF module multiple instances of binary software,
  where each binary is compiled for another target platform and a best suited binary is selected for a target execution unit.

9. The method according to claim 7, wherein knowledge on a mapping of hardware-level performance characteristics and actually achieved KPI is acquired under real world workloads and said knowledge is used to adjust information contained in said n:m mapping included in the VNF description template.

10. The method of claim 1, further comprising:
  informing the VNF about a set of parameters that describe performance of hardware the VNF is installed on to enable a VNF to adapt to the hardware.

11. The method of claim 10, wherein
  the parameters comprise parameters for the execution units on which the VNF modules are installed and
  parameters that describe network links that interconnect said execution units and/or said VNF modules.

12. The method according to claim 1, further comprising:
  an interface for providing requirements for a VNF, wherein said requirements comprise one or more of the following:
    the type of VNF and the KPIs that it should accomplish;
    information on a geographical area where the VNF is to be instantiated;
    a maximum latency to interconnect a certain given node in the network and the VNF;
    an update request on required capacity of the VNF.

13. An apparatus for implementing an entity of a network by virtualizing said network entity and implementing said network entity on one or more servers each acting as an execution unit for executing thereon one or more applications running and/or one or more virtual machines running on said execution unit, each of said applications or virtual machines running on a server and implementing at least a part of a functionality of said network entity being called a virtual network function VNF module, wherein a plurality of said VNF modules together implement said network entity to thereby form a virtual network function VNF, said apparatus comprising:
  a module adapted to obtain m application-level key performance indicators (KPIs) specifying a required overall performance of the VNF,
  a module adapted to obtain n hardware-level performance characteristics for available types of execution units,
  a module adapted to determine one or more possible deployment plans based on the obtained m application-level KPIs and n hardware-level performance characteristics through an n:m mapping of n hardware-level performance characteristics for available types of execution units to m application-level KPIs achieved by a VNF module performing on an execution unit of a respective type of the available types,
  wherein determining VNF module performance information for the available types of execution units is obtained by determining a VNF module performance on a certain type of execution unit by installing said VNF module on said execution unit, putting load on said VNF module with a traffic generator and measuring the KPIs that can be achieved without violating QoS values specified for said VNF module and/or without violating resource limits of said execution unit,
  each VNF deployment plan specifying number and types of execution units, such that joint performance of VNF modules running on said execution units achieves the required overall performance of the VNF,
the apparatus further comprising
  a module adapted to determine one or more construction plans that specify an allocation of the plurality of VNF modules to actual execution units according to one of the one or more possible VNF deployment plans, requirements for networking resources linking the VNF modules, and currently available datacenter resources; and
  a module adapted to deploy individual VNF modules of the plurality of VNF modules according to one of the one or more construction plans.

\* \* \* \* \*

UNITED STATES PATENT AND TRADEMARK OFFICE
CERTIFICATE OF CORRECTION

PATENT NO. : 9,760,391 B2  
APPLICATION NO. : 14/483832  
DATED : September 12, 2017  
INVENTOR(S) : Wolfgang Kiess et al.

Page 1 of 1

It is certified that error appears in the above-identified patent and that said Letters Patent is hereby corrected as shown below:

In the Claims

Claim 1, Column 18, Line 32: Italicize *m* after "obtaining"  
Claim 1, Column 18, Line 35: Italicize *n* after "obtaining"  
Claim 1, Column 18, Line 38: Italicize *n* before "and"

Claim 2, Column 19, Line 1: Add "to" between "according" and "claim"

Claim 12, Column 20, Line 9: Add "and" at end of line following the ";"

Signed and Sealed this  
Fourth Day of June, 2019

Andrei Iancu  
*Director of the United States Patent and Trademark Office*